United States Patent
Su et al.

(10) Patent No.: US 12,099,230 B2
(45) Date of Patent: Sep. 24, 2024

(54) ELECTRONIC DEVICE

(71) Applicant: InnoLux Corporation, Miao-Li County (TW)

(72) Inventors: Hui-Wen Su, Miao-Li County (TW); Wei-Tsung Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/341,229

(22) Filed: Jun. 26, 2023

(65) Prior Publication Data
US 2024/0036244 A1    Feb. 1, 2024

(30) Foreign Application Priority Data

Jul. 27, 2022   (CN) .......................... 202210889765.X (51) Int. Cl.
*F21V 8/00*   (2006.01)
(52) U.S. Cl.
CPC ......... *G02B 6/0053* (2013.01); *G02B 6/0051* (2013.01); *G02B 6/0068* (2013.01)
(58) Field of Classification Search
CPC ... G02B 6/0053; G02B 6/0051; G02B 6/0068
See application file for complete search history.

(56) References Cited

U.S. PATENT DOCUMENTS

| | | | | |
|---|---|---|---|---|
| 11,550,185 B2 * | 1/2023 | Kim | ..................... | G02B 6/0025 |
| 2012/0314442 A1 * | 12/2012 | Takahashi | ............ | G02B 6/0068 |
| | | | | 362/327 |
| 2016/0054507 A1 * | 2/2016 | Hirayama | ............ | G02B 6/0091 |
| | | | | 362/607 |
| 2017/0227701 A1 * | 8/2017 | Nishikawa | ........... | G02B 6/0055 |
| 2021/0011212 A1 * | 1/2021 | Hsu | ..................... | G02B 6/0053 |
| 2021/0286214 A1 * | 9/2021 | Chen | .................... | G02B 6/0051 |

FOREIGN PATENT DOCUMENTS

TW          202043881 A    12/2020

* cited by examiner

*Primary Examiner* — Evan P Dzierzynski
*Assistant Examiner* — Jessica M Apenteng
(74) *Attorney, Agent, or Firm* — MUNCY, GEISSLER, OLDS & LOWE, P.C.

(57) ABSTRACT

An electronic device includes a panel and a backlight module arranged corresponding to the panel. The backlight module includes a light guide plate, a first optical light module and a second optical module. The first optical element is arranged on the light guide plate, and has a first prism structure. The second optical element is arranged on the first optical element, and has a second prism structure. The first prism structure has a first vertex angle, and the second prism structure has a second vertex angle greater than the first vertex angle.

19 Claims, 6 Drawing Sheets

ELECTRONIC DEVICE

CROSS-REFERENCE TO RELATED APPLICATIONS

This application claims the benefits of the Chinese Patent Application Serial Number 202210889765.X, filed on Jul. 27, 2022, the subject matter of which is incorporated herein by reference.

BACKGROUND

Field of the Disclosure

The present disclosure relates to an electronic device and, more particularly, to an electronic device including specially designed optical elements.

Description of Related Art

With the continuous development of technology, electronic devices are designed to be anti-peeping, low power consumption, high quality or low cost. Nowadays, in order to obtain electronic devices with more concentrated light sources, anti-peeping sheets are typically attached on the electronic devices or collimated backlight modules are used so as to achieve privacy. However, the aforementioned methods still have disadvantages such as high energy consumption, high cost or low yield.

Therefore, it is desired to provide an electronic device to eliminate the above defects.

SUMMARY

The present disclosure provides an electronic device, which includes: a panel; and a backlight module arranged corresponding to the panel. The backlight module includes: a light guide plate; a first optical element arranged on the light guide plate, and provided with a first prism structure; and a second optical element arranged on the first optical element, and provided with a second prism structure, wherein the first prism structure has a first vertex angle, the second prism structure has a second vertex angle, and the second vertex angle is greater than the first vertex angle.

Other novel features of the disclosure will become more apparent from the following detailed description when taken in conjunction with the accompanying drawings.

DETAILED DESCRIPTION OF EMBODIMENT

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. Furthermore, in the specification and claims, unless otherwise specified, ordinal numbers, such as "first", "second", etc., used herein are intended to distinguish elements rather than disclose explicitly or implicitly that names of the elements bear the wording of the ordinal numbers. The ordinal numbers do not imply what order an element and another element are in terms of space, time or steps of a manufacturing method.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to". Therefore, when the terms "comprising", "containing" and/or "having" are used in the description of the present disclosure, it specifies the existence of corresponding features, regions, steps, operations and/or components, but does not exclude the existence of one or more corresponding features, regions, steps, operations and/or components.

In the description, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In the present disclosure, the measurement method of length, height and angle may be obtained by using an optical microscope, and the length, height and angle may be obtained by measuring the cross-sectional image in an electron microscope, but it is not limited thereto. In addition, any two values or directions used for comparison may have certain errors. If the first value is equal to the second value, it implies that there may be an error of about 10% between the first value and the second value. If the first direction is perpendicular to the second direction, the angle between the first direction and the second direction may be in a range of 80 to 100 degrees. If the first direction is parallel to the second direction, the angle between the first direction and the second direction may be in a range of 0 to 10 degrees.

It should be noted that the technical solutions provided in different embodiments below may be replaced, combined or mixed to form another embodiment without violating the spirit of the present disclosure.

Figure 1:
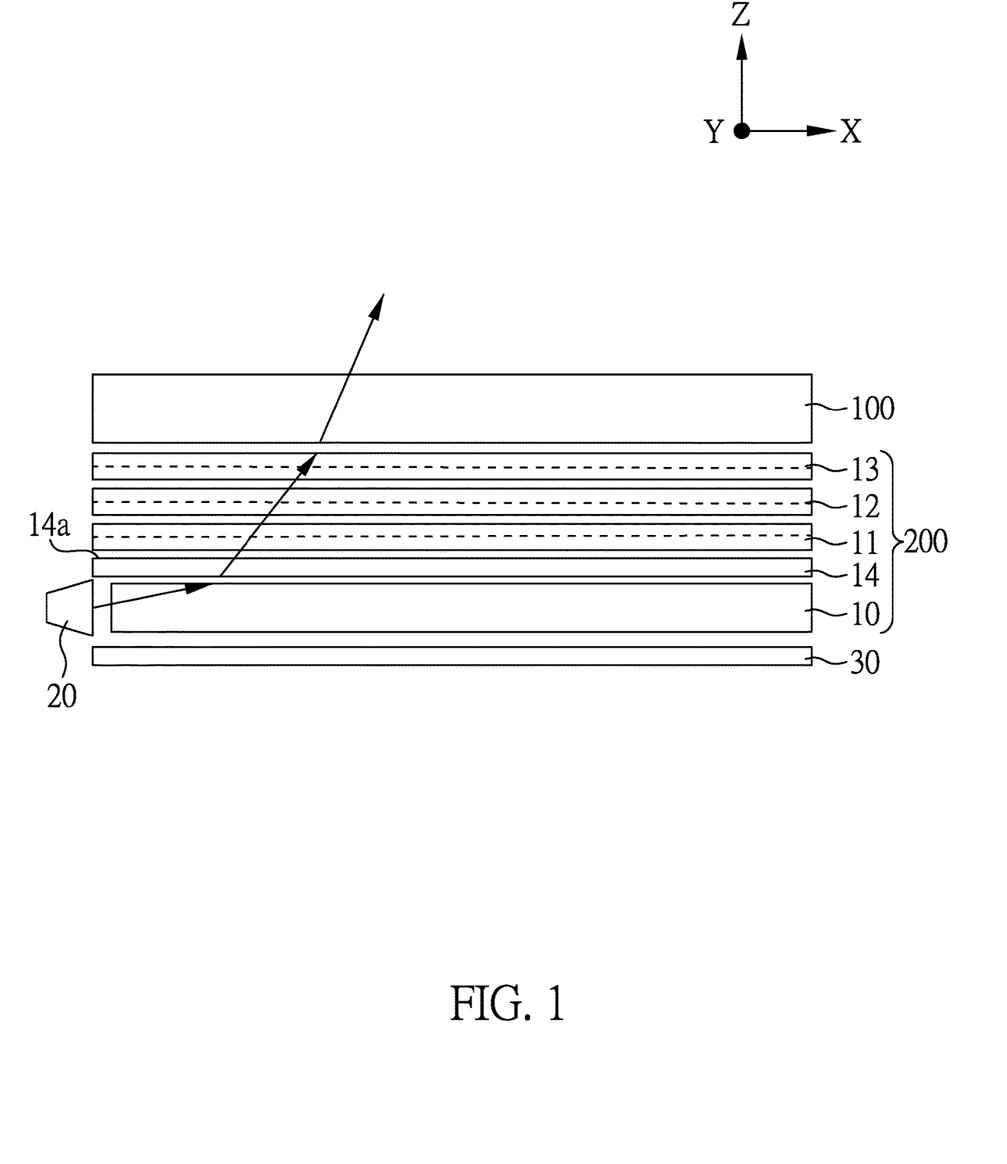
FIG. 1 is a schematic cross-sectional view of the electronic device according to an embodiment of the present disclosure.
Figure 2A:
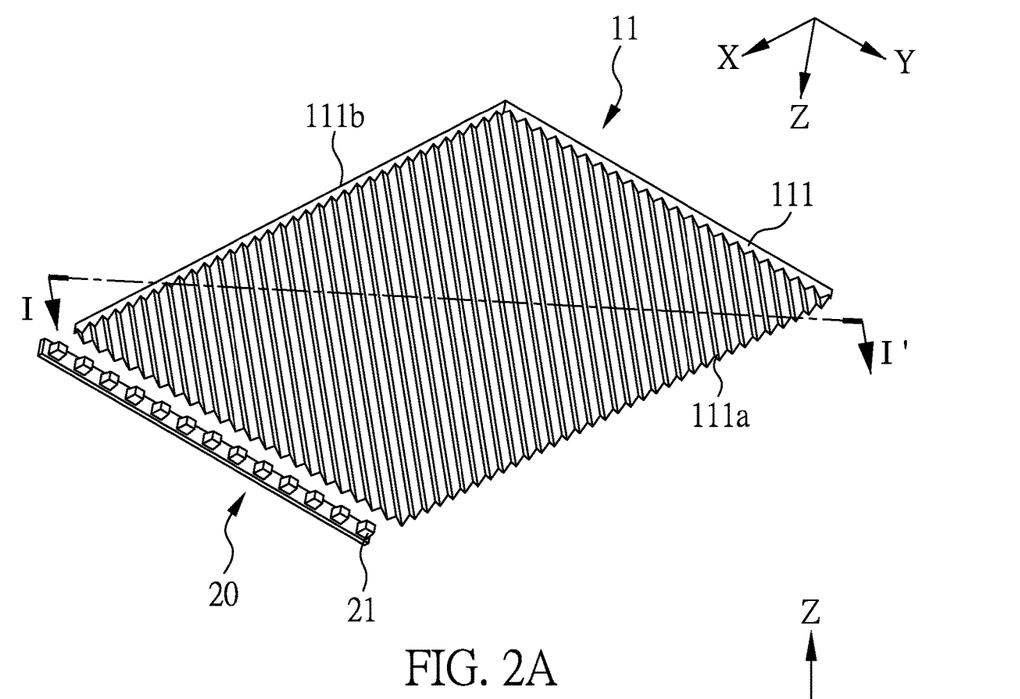
FIG. 2A is a schematic perspective view of the first optical element according to an embodiment of the present disclosure.
Figure 2B:
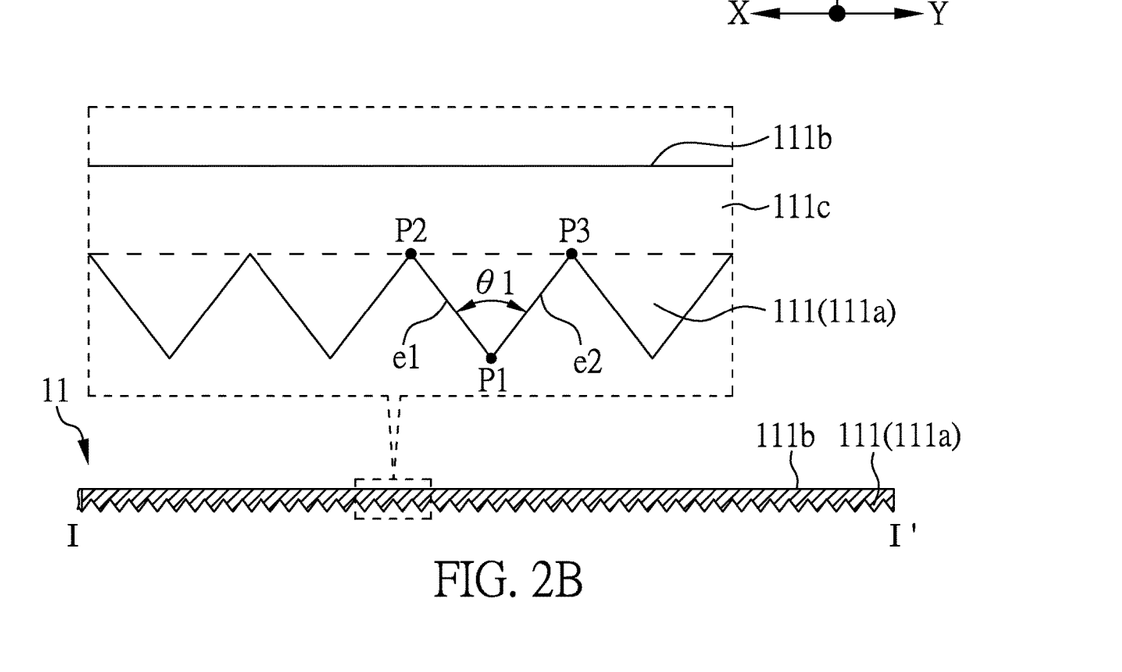
FIG. 2B is a cross-sectional view of the first optical element of FIG. 2A, taken along line I-I'.
Figure 3A:
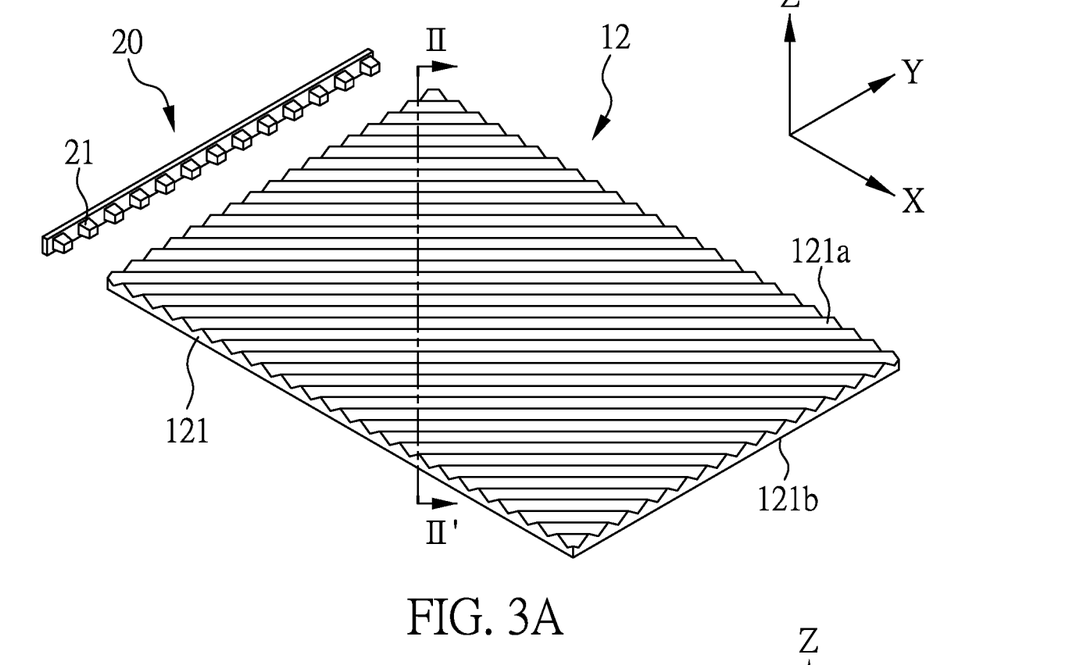
FIG. 3A is a schematic perspective view of the second optical element according to an embodiment of the present disclosure.
Figure 3B:
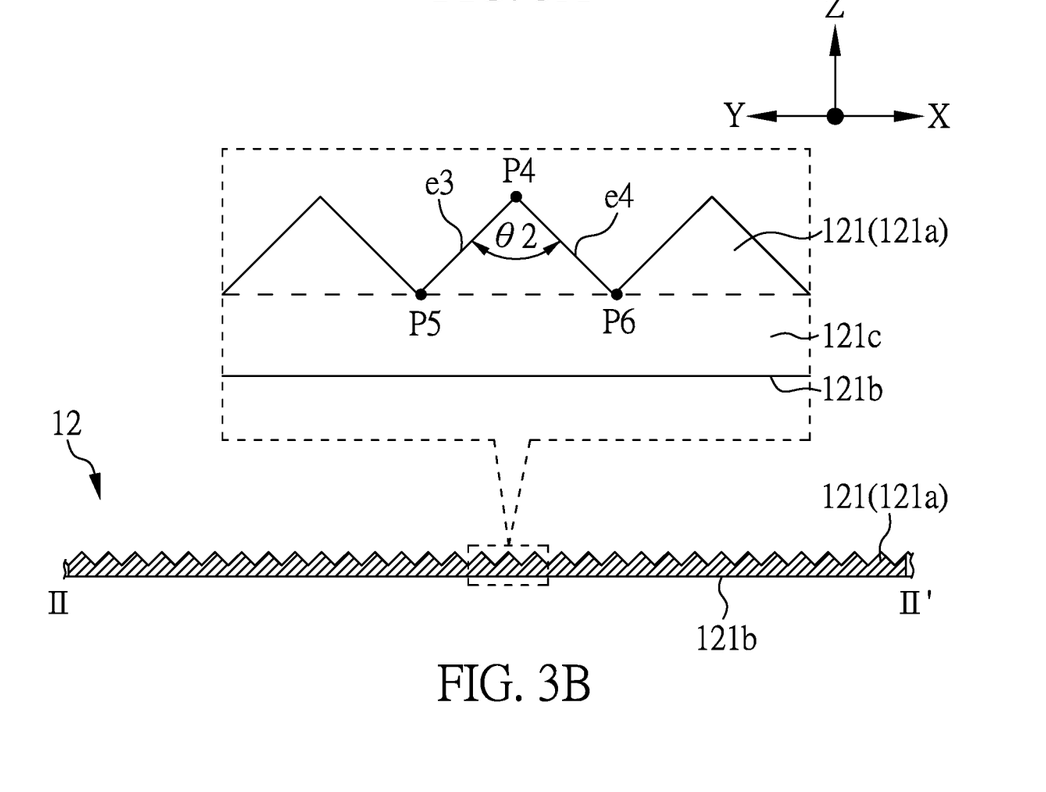
FIG. 3B is a cross-sectional view of the second optical element of FIG. 3A, taken along line II-II'.

FIG. 1 is a schematic cross-sectional view of the electronic device according to an embodiment of the present disclosure. FIG. 2A is a schematic perspective view of the first optical element according to an embodiment of the present disclosure. FIG. 2B is a cross-sectional view of the first optical element of FIG. 2A, taken along line I-I'. FIG. 3A is a schematic perspective view of the second optical element according to an embodiment of the present disclosure. FIG. 3B is a cross-sectional view of the second optical element of FIG. 3A, taken along line II-II'.

As shown in FIG. 1, the electronic device of the present disclosure may include: a panel 100; and a backlight module 200 arranged corresponding to the panel 100. The backlight module 200 may include: a light guide plate 10; a first optical element 11 arranged on the light guide plate 10; a second optical element 12 arranged on the first optical element 11; a light source 20 arranged opposite to the light guide plate 10; and a reflective element 30 arranged under the light guide plate 10. In more detail, as shown in FIG. 2A to FIG. 3B, the first optical element 11 may have a first prism structure 111, and the second optical element 12 may have a second prism structure 121, wherein the first prism structure 111 faces to the light guide plate 10 (as shown in FIG. 1), and the second prism structure 121 faces to the panel 100 (as shown in FIG. 1). In the present disclosure, with the arrangement of the first optical element 11 and the second optical element 12, the light emitted by the backlight module 200 may be concentrated and directed toward the front viewing angle, so as to satisfy the privacy requirement without additional attachment or setting of anti-peeping sheet, or without using low-yield and/or high-cost collimated backlight modules.

In the present disclosure, as shown in FIG. 2A to FIG. 3B, the first prism structure 111 may have a plurality of first strip structures 111a and a surface 111b, and the surface 111b is opposite to the plurality of first strip structures 111a. The second prism structure 121 may have a plurality of second strip structures 121a and a surface 121b, and the surface 121b is opposite to the plurality of second strip structures 121a. The first prism structure 111 facing the light guide plate 10 means that the first strip structures 111a are closer to the light guide plate 10 than the surface 111b (as shown in FIG. 1), and the second prism structure 121 facing the panel 100 means that the second strip structures 121a are closer to the panel 100 than the surface 121b (as shown in FIG. 1).

In the present disclosure, although not shown, the panel 100 may include upper and lower substrates, display units, seals, alignment films, polarizers, black matrix layers, color filter layers and/or driving elements, etc., but the present disclosure is not limited thereto. In the present disclosure, as shown in FIG. 2A or FIG. 3A, the light source 20 may include a plurality of light emitting elements 21, and the plurality of light emitting elements 21 may be arranged along a first direction Y, for example. In FIG. 2A and FIG. 3A, only the first optical element 11, the second optical element 12 and the light source 20 are shown. The light source 20 in FIG. 2A and FIG. 3A is used to describe the arrangement direction of the light emitting elements 21, while the light source 20 is actually configured is on one side of the light incident surface of the light guide plate 10, as shown in FIG. 1.

In the present disclosure, the light source 20 may include a light emitting diode, and the light emitting diode may include, for example, an organic light emitting diode (OLED), a sub-millimeter light emitting diode (mini LED), a micro light emitting diode (micro LED) or quantum dot light emitting diode (quantum dot LED, which may include QLED, QDLED), fluorescence, phosphor or other suitable materials, or a combination thereof, but the present disclosure is not limited thereto. In the present disclosure, the reflective element 30 is used to reflect the light emitted from the bottom of the light guide plate 10, so that the light travels toward the panel 100 to improve the utilization rate of the light. In the present disclosure, the material of the reflective element 30 is not particularly limited, and it may include, for example, metal, white ink, other reflective materials or a combination thereof, wherein the metal may include gold, silver, copper, aluminum or a combination thereof, but the present disclosure is not limited thereto. The white ink may include white polyimide, resin or a combination thereof, but the present disclosure is not limited thereto. In addition, the reflective element 30 may include a single-layer or multi-layer reflective film.

The detailed structures of the first optical element 11 and the second optical element 12 of the present disclosure will be introduced in detail below.

As shown in FIG. 2A, the first prism structure 111 of the first optical element 11 may have the plurality of first strip structures 111a and the surface 111b opposite to the plurality of first strip structures 111a, and the plurality of light emitting elements 21 may be arranged along the first direction Y, wherein, the included angle between the extension direction of the first prism structure 111 and the first direction Y may be greater than or equal to 30° and smaller than or equal to 60° (30°≤included angle≤60°). More specifically, the "extension direction of the first prism structure 111" is the extension direction of the first strip structure 111a, and the "included angle between the extension direction of the first prism structure 111 and the first direction Y" refers to the included angle between the extension direction of the first strip structure 111a and the first direction Y, for example, an acute angle between the extension direction of the first strip structure 111a and the first direction Y. In the present disclosure, the surface 111b of the first optical element 11 is a surface away from the light guide plate 10 (as shown in FIG. 1), which may be a rough surface, wherein the haze of the rough surface may be smaller than 10%, for example, may be greater than 0% and smaller than 10% (0%<haze<10%). In the present disclosure, the haze of the surface 111b of the first optical element 11 may be generated by embossing, sandblasting or other suitable processes, but the present disclosure is not limited thereto. The haze of the surface 111b is designed to reduce the risk of mutual adsorption between the first optical element 11 and the second optical element 12 (as shown in FIG. 1), so as to improve taste defects.

In addition, as shown in FIG. 2B, in the cross-sectional view, the first prism structure 111 (first strip structure 111a) may be an isosceles triangle with a first vertex angle $\theta 1$. The "isosceles triangle" means that the two edges e1, e2 of the first strip structure 111a have the same length. More specifically, the first prism structure 111 may include a plurality of edges e1, e2, wherein two edges may intersect at a vertex P1 to form the first strip structure 111a. The ends P2, P3 of the two edges e1, e2 may be respectively connected to other first strip structures 111a, and the included angle between the edges e1, e2 is the first vertex angle $\theta 1$, so that the isosceles triangle means that the distances from the vertex P1 of the first prism structure 111 (first strip structure 111a) to the ends P2 and P3 are equal. In the present disclosure, the first vertex angle $\theta 1$ may be greater than or equal to 75° and smaller than or equal to 85° ($75° \leq \theta 1 \leq 85°$).

As shown in FIG. 3A, the second prism structure 121 of the second optical element 12 may have a plurality of second strip structures 121a and a surface 121b corresponding to the plurality of second strip structures 121a, and the plurality of light emitting elements 21 may be arranged along the first direction Y, wherein the included angle between the extension direction of the second prism structure 121 and the first direction Y may be greater than or equal to 30° and smaller than or equal to 60° ($30° \leq$ included angle $\leq 60°$), and the extension direction of the second prism structure 121 and the extension direction of the first prism structure 111 may be perpendicular to each other. More specifically, the "extension direction of the second prism structure 121" is the extension direction of the second strip structure 121a, and the included angle between the "extension direction of the second prism structure 121 and the first direction Y" refers to the included angle between the extension direction of the second strip structure 121a and the first direction Y, for example, an acute angle between the extension direction of the second strip structure 121a and the first direction Y. The term "perpendicular to each other" means that the included angle between the extension direction of the second prism structure 121 and the extension direction of the first prism structure 111 is greater than or equal to 87° and smaller than or equal to 93° ($87° \leq$ included angle $\leq 93°$).

In addition, as shown in FIG. 3B, in the cross-sectional view, the second prism structure 121 (second strip structure 121a) may be an isosceles triangle with a second vertex angle $\theta 2$. The "isosceles triangle" means that the two edges e3, e4 of the second strip structure 121a have the same length. More specifically, the second prism structure 121 may include a plurality of edges e3, e4, wherein two edges e3, e4 may intersect at a vertex P4 to form the second strip structure 121a. The ends P5, P6 of the two edges e3, e4 may be respectively connected to other second strip structures 121a, and the included angle between the edges e3, e4 is the second vertex angle $\theta 2$, so that an isosceles triangle means that the distances from the vertex P4 of the second prism structure 121 (second strip structure 121a) to the ends P5 and P6 are equal. In the present disclosure, the second vertex angle $\theta 2$ may be greater than or equal to 90° and smaller than or equal to 100° ($90° \leq \theta 2 \leq 100°$). In one embodiment of the present disclosure, the second vertex angle $\theta 2$ may be greater than the first vertex angle $\theta 1$.

In this disclosure, at an optical wavelength of 550 nm, the refractive index n1 of the first optical element 11 and the refractive index n2 of the second optical element 12 may be greater than or equal to 1.45 and smaller than or equal to 1.70 ($1.45 \leq n1 \leq 1.70$; $1.45 \leq n2 \leq 1.70$). In the present disclosure, the first optical element 11 and the second optical element 12 may be prepared using the same or different materials, and thus the refractive index n1 and the refractive index n2 may be the same or different. In the present disclosure, the materials of the first optical element 11 and the second optical element 12 may include transparent materials, but the present disclosure is not limited thereto. In one embodiment of the present disclosure, the first optical element 11 and the second optical element 12 may include substrates (such as the first substrate 111c and the second substrate 121c) and corresponding prism structures (such as the first prism structure 111 and the second prism structure 121). The material of the aforementioned substrate or prism structure may include polycarbonate (PC), polyimide (PI), polyethylene polyethylene terephthalate (PET), polyether polyol (POP), polymethylmethacrylate (PMMA), cycloolefin polymer (COP), rubber, glass, other suitable materials or a combination thereof, but the present disclosure is not limited thereto. In one embodiment of the present disclosure, the material of the aforementioned prism structure may include light curable glue, heat curable glue, light-heat curable glue, moisture curable glue, other suitable materials or a combination thereof, but the present disclosure is not limited thereto. In one embodiment of the present disclosure, the material of the prism structure may include optical clear adhesive (OCA), optical clear resin (OCR), acrylic resin, other suitable materials, or a combination thereof, but the present disclosure is not limited thereto.

Through the angle design of the first vertex angle $\theta 1$ of the first prism structure 111 and the second vertex angle $\theta 2$ of the second prism structure 121, the electronic device of the present disclosure is able to achieve a better effect of concentrating and directing light toward the front viewing angle. In addition, according to the arrangement positions of the first optical element 11 and the second optical element 12, for example, the relationship of the included angle between each of the first prism structure 111 and the second prism structure 121 and the first direction Y (direction in which the light emitting elements 21 are arranged), or the relationship that the first prism structure 111 and the second prism structure 121 are respectively facing or away from the light guide plate 10, so that the light emitted from the backlight module 200 may be concentrated and directed toward the front viewing angle. Therefore, the electronic device of the present disclosure may meet the privacy requirement without additionally attaching or installing an anti-peeping sheet, or without using a low-yield and/or high-cost collimated backlight module.

Figure 4:
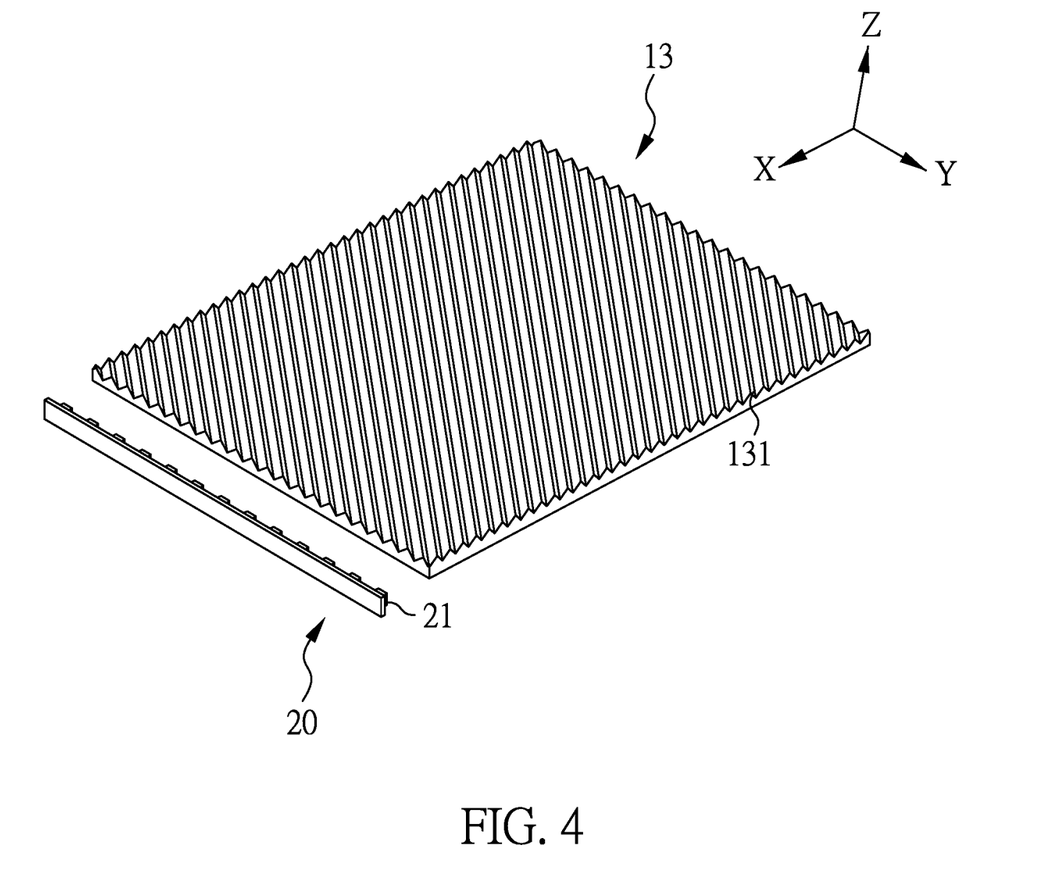
FIG. 4 is a schematic perspective view of the third optical element according to an embodiment of the present disclosure.

FIG. 4 is a three-dimensional schematic diagram of the third optical element according to an embodiment of the present disclosure.

In one embodiment of the present disclosure, as shown in FIG. 1 and FIG. 4, the backlight module 200 may further include a third optical element 13 with a third prism structure 131, wherein the second optical element 12 is arranged between the first optical element 11 and the third optical element 13. In the present disclosure, as shown in FIG. 4, the structure of the third optical element 13 is similar to the structure of the second optical element 12, except that the extension direction of the third prism structure 131 of the third optical element 13 is different from the extension direction of the second prism structures 121 of the second optical element 12. More specifically, the third optical element 13 may have a third prism structure 131, and the third prism structure 131 faces the panel 100, wherein the extension direction of the third prism structure 131 and the extension direction of the first prism structure 111 may be parallel to each other. Herein, the term "parallel to each other" means that the included angle between the extension direction of the third prism structure 131 and the extension direction of the first prism structure 111 is greater than or equal to 0° and smaller than or equal to 3° (0°≤included angle≤3°). In addition, similar to FIG. 3B, in the cross-sectional view, the third prism structure 131 may be an isosceles triangle with a third vertex angle θ3 (not shown). In the present disclosure, the third vertex angle θ3 may be greater than or equal to 90° and smaller than or equal to 100° (90°≤θ3≤100°). In one embodiment of the present disclosure, the third vertex angle θ3 may be greater than the first vertex angle θ1.

In addition, as shown in FIG. 1, in one embodiment of the present disclosure, the backlight module 200 may further include a diffusion element 14, which may be arranged on the light guide plate 10. More specifically, the diffusion element 14 may be arranged between the light guide plate 10 and the first optical element 11. In the present disclosure, the surface 14a of the diffusion element 14 is a surface away from the light guide plate 10, and the haze of the surface 14a of the diffusion element 14 may be greater than or equal to 50%, for example, may be greater than 50% to smaller than or equal to 95%, but the present disclosure is not limited thereto. The diffusion element 14 may be used to diffuse the light emitted by the light source 20 to make the brightness of the backlight module 200 more uniform.

Figure 5:
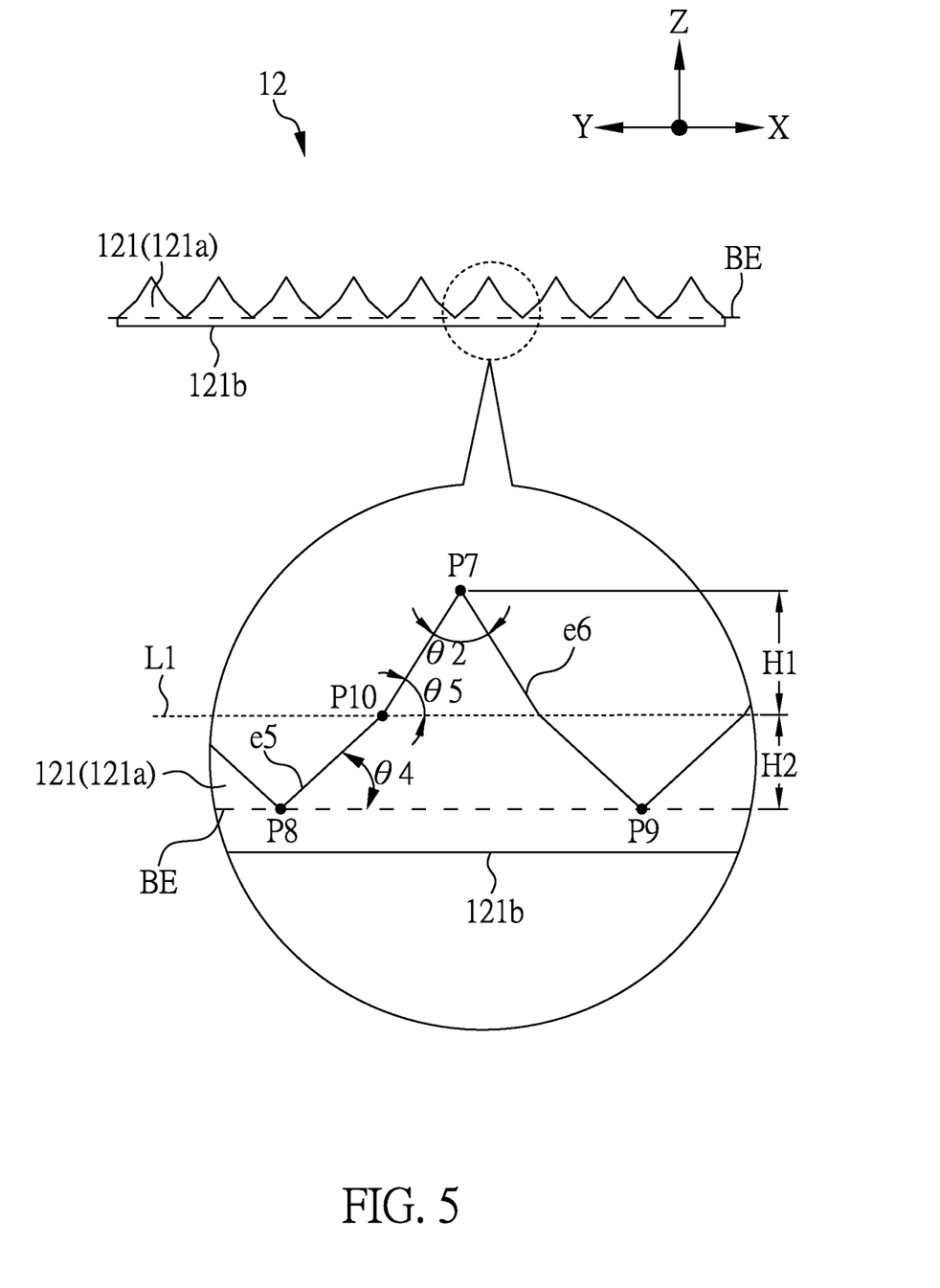
FIG. 5 is a cross-sectional view of part of the second optical element according to an embodiment of the present disclosure.

FIG. 5 is a cross-sectional view of part of the second optical element according to an embodiment of the present disclosure, wherein the sectional view of FIG. 5 is similar to that of FIG. 3B, except for the following differences.

As shown in FIG. 5, in the cross-sectional view, the second prism structure 121 may include a plurality of edges e5, e6, wherein two edges e5, e6 may intersect at a vertex P7 to form the second strip structure 121a, and the ends P8, P9 of the two edges may be respectively connected to other second strip structures 121a, where the included angle between the edges e5 and e6 is the second vertex angle θ2. In the present disclosure, the ends P8, P9 of the edges e5, e6 may form a connection line, and the extension line of the connection line may be the bottom edge BE of the second prism structure 121 (second strip structure 121a), wherein the bottom edge BE is an imaginary reference line. In the present disclosure, the edge e5 may include a turning point P10. In more detail, the edge e5 between the second vertex angle θ2 and the bottom edge BE of the second prism structure 121 (second strip structure 121a) may include the turning point P10. In addition, as shown in FIG. 5, in the normal direction Z of the light guide plate 10, the distance from the second vertex angle θ2 to the turning point P10 is a first height H1, and the distance from the turning point P10 to the bottom edge BE of the second prism structure 121 is a second height H2, wherein the ratio of the first height H1 to the second height H2 may be greater than or equal to 0.5 and smaller than or equal to 2 (0.5≤H1/H2≤2).

In addition, as shown in FIG. 5, a base angle θ4 may be included between the edge e5 and the bottom edge BE of the second prism structure 121 (second strip structure 121a), and the base angle θ4 may be greater than or equal to 30° and smaller than or equal to 50° (30°≤θ4≤50°). In some embodiments, in a direction parallel to the light guide plate 10, an included angle θ5 (for example, an acute angle) between an extension line L1 passing through the turning point P10 and the edge e5 of the second prism structure 121 (second strip structure 121a) may be different from the base angle θ4. Herein, the extension line L1 is an imaginary reference line. In this embodiment, the included angle θ5 (for example, an acute angle) may be smaller than the base angle θ4, but the present disclosure is not limited thereto. In other embodiments of the present disclosure, the included angle θ5 (for example, an acute angle) may be greater than the base angle θ4.

In this disclosure, the structure of the third optical element 13 (as shown in FIG. 4) is similar to that of the second optical element 12, except that the extension direction of the third prism structure 131 (as shown in FIG. 4) of the third optical element 13 (as shown in FIG. 4) is different from the extension direction of the second prism structure 121 of the second optical element 12. Therefore, in some embodiments, the third prism structure 131 may be similar to the second prism structure 121 shown in FIG. 5, and a detailed description is deemed unnecessary. In other words, although not shown, in some embodiments, the third prism structure 131 may have a ratio of the first height H1 to the second height H2 greater than or equal to 0.5 and smaller than or equal to 2, and/or the included angle θ5 (for example, an acute angle) different from the base angle θ4.

Figure 6A:
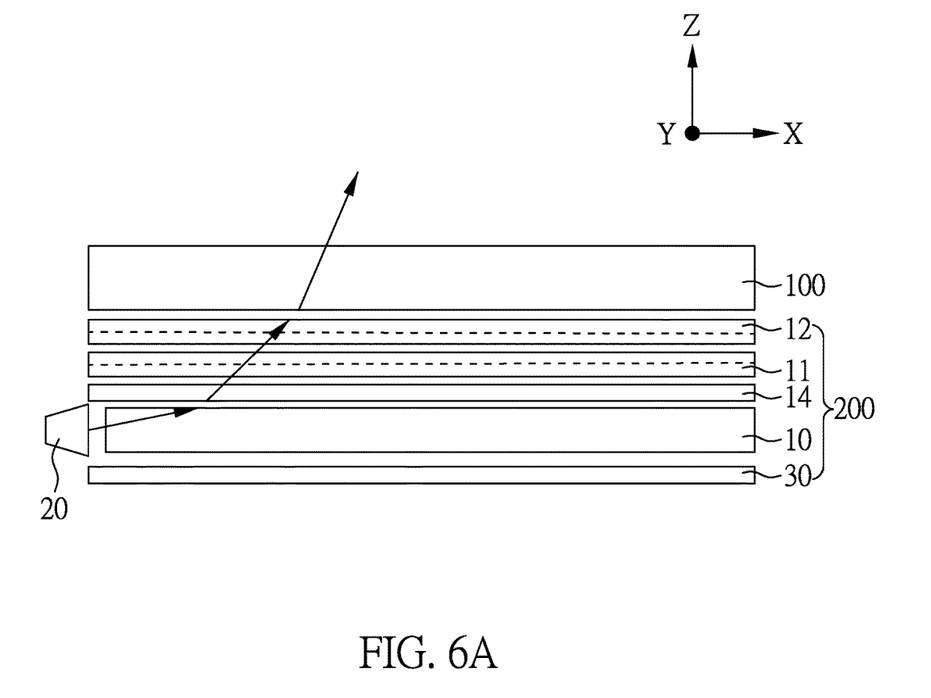
FIG. 6A is a schematic cross-sectional view of the electronic device according to another embodiment of the present disclosure.
Figure 6B:
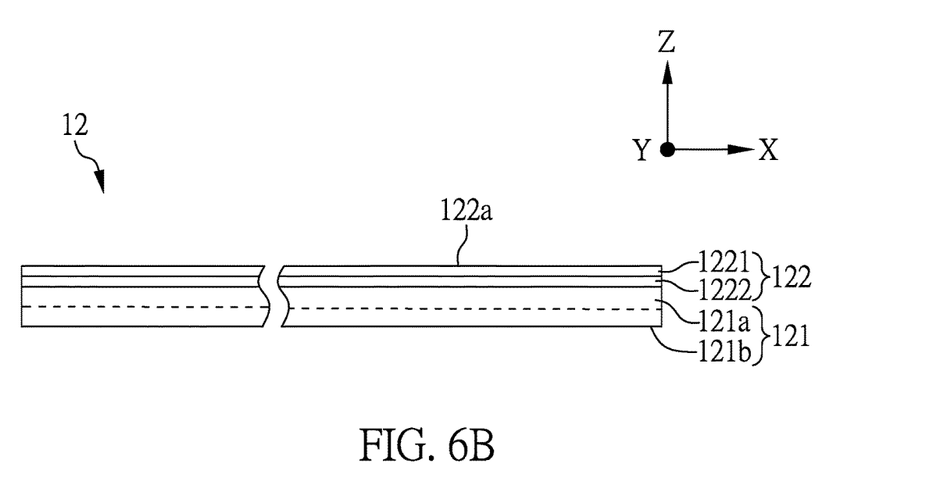
FIG. 6B is an enlarged view of part of the electronic device of FIG. 6A.

FIG. 6A is a schematic cross-sectional view of the electronic device according to another embodiment of the present disclosure, and FIG. 6B is an enlarged view of part of the electronic device FIG. 6A, wherein the electronic device of FIG. 6A is similar to that of FIG. 1 except for the following differences.

As shown in FIG. 6A, the electronic device may include: a panel 100; and a backlight module 200 arranged corresponding to the panel 100, wherein the backlight module 200 may include: a light guide plate 10; a first optical element 11 arranged on the light guide plate 10; a second optical element 12 arranged on the first optical element 11; a light source 20 arranged opposite to the light guide plate 10; a reflective element 30 arranged under the light guide plate 10; and a diffusion element 14 arranged on the light guide plate 10.

In this embodiment, as shown in FIG. 6B, the second optical element 12 may further include a sticking material 122 arranged on the second prism structure 121. More specifically, the sticking material 122 may include an insulating layer 1221 and an adhesive layer 1222, wherein the adhesive layer 1222 is arranged between the insulating layer 1221 and the second prism structure 121. In the present disclosure, the sticking material 122 may be arranged on the second prism structure 121 through the adhesive layer 1222. In some embodiments, the sticking material 122 may be used to concentrate and direct light to the position of the front viewing angle of the electronic device, but the present disclosure is not limited thereto. In this embodiment, the second prism structure 121 may be that shown in FIG. 3A, FIG. 3B or FIG. 5, and a detailed description is deemed unnecessary.

In this disclosure, the material of the insulating layer 1221 may be polycarbonate (PC), polyimide (PI), polypropylene (PP), polyethylene terephthalate (PET), or other plastic or polymer materials, or a combination thereof, but the present disclosure is not limited thereto. In the present disclosure, the material of the adhesive layer 1222 may be glass glue, optical glue, silicon glue, adhesive tape, hot melt glue, AB glue, bi-component adhesive, polymer glue or a combination thereof, but the present disclosure is not limited thereto. At an optical wavelength of 550 nm, the refractive index n3 of the sticking material 122 may be greater than or equal to 1.50 and smaller than or equal to 1.60 (1.50≤n3≤1.60). In some embodiments, the sticking material 122 may include a surface 122a away from the second prism structure 121, which may be a rough surface, wherein the haze of the rough surface may be greater than or equal to 3% and smaller than or equal to 50% (3%≤haze≤50%). In addition, the rough surface may be prepared by embossing, sandblasting or other suitable processes, but the present disclosure is not limited thereto. In the present disclosure, the surface 122a of the sticking 122 does not have prism or other geometric structures.

The backlight module 200 of the present disclosure may be applied to various electronic devices that require a display panel, and the display panel may be, for example, a flexible display panel, a touch display panel, a curved display panel, or a tiled display panel, but the present disclosure is not limited thereto. The electronic device of the present disclosure may be, for example, a monitor, a mobile phone, a notebook computer, a video camera, a camera, a music player, a mobile navigation device, a mobile electronic device, a television, and other electronic devices that need to display images, but the present disclosure is not limited thereto.

The aforementioned specific embodiments should be construed as merely illustrative, and not limiting the rest of the present disclosure in any way.

The invention claimed is:

1. An electronic device, comprising:
   a panel; and
   a backlight module arranged corresponding to the panel, wherein the backlight module includes:
   a light guide plate;
   a first optical element arranged on the light guide plate, and provided with a first prism structure; and
   a second optical element arranged on the first optical element, and provided with a second prism structure,
   wherein the first prism structure has a first vertex angle, the second prism structure has a second vertex angle, and the second vertex angle is greater than the first vertex angle,
   wherein, in a cross-sectional view, an edge between the second vertex angle and a bottom edge of the second prism structure includes a turning point and, in a normal direction of the light guide plate, a distance between the second vertex angle and the turning point is a first height, and a distance between the turning point and the bottom edge of the second prism structure is a second height, wherein a ratio of the first height to the second height is greater than or equal to 0.5 and smaller than or equal to 2.

2. The electronic device as claimed in claim 1, wherein the first vertex angle is greater than or equal to 75° and smaller than or equal to 85°, and the second vertex angle is greater than or equal to 90° and smaller than or equal to 100°.

3. The electronic device as claimed in claim 1, wherein each of refractive indices of the first optical element and the second optical element is greater than or equal to 1.45 and smaller than or equal to 1.70.

4. The electronic device as claimed in claim 1, wherein a surface of the first optical element away from the light guide plate is a rough surface, and a haze of the rough surface is smaller than 10%.

5. The electronic device as claimed in claim 1, wherein the first prism structure faces the light guide plate, and the second prism structure faces the panel.

6. The electronic device as claimed in claim 5, wherein the first prism structure has a plurality of first strip structures and a first surface opposite to the plurality of first strip structures, and the second prism structure has a plurality of second strip structures and a second surface opposite to the plurality of second strip structures.

7. The electronic device as claimed in claim 6, wherein the first strip structures are closer to the light guide plate than the first surface, and the second strip structures are closer to the panel than the second surface.

8. The electronic device as claimed in claim 1, wherein the backlight module further comprises a light source including a plurality of light emitting elements arranged along a first direction, and an included angle between an extension direction of the first prism structure and the first direction is greater than or equal to 30° and smaller than or equal to 60°, where an extension direction of the second prism structure is perpendicular to the extension direction of the first prism structure.

9. The electronic device as claimed in claim 1, wherein the backlight module further comprises a third optical element having a third prism structure, and the second optical element is arranged between the first optical element and the third optical element, where the third optical element has a third vertex angle greater than the first vertex angle.

10. The electronic device as claimed in claim 9, wherein the third vertex angle is greater than or equal to 90° and smaller than or equal to 100°.

11. The electronic device as claimed in claim 9, wherein the third prism structure faces the panel, and an extension direction of the third prism structure and an extension direction of the first prism structure are parallel to each other.

12. The electronic device as claimed in claim 1, wherein the backlight module further comprises a diffusion element arranged on the light guide plate, and the diffusion element has a surface away from the light guide plate, where a haze of the surface is greater than or equal to 50%.

13. The electronic device as claimed in claim 1, wherein the second prism structure includes a base angle, and the base angle is greater than or equal to 30° and smaller than or equal to 50°.

14. The electronic device as claimed in claim 13, wherein, in a direction parallel to the light guide plate, an included angle between an extension line passing through the turning point and the edge of the second prism structure is different from the base angle of the second prism structure.

15. The electronic device as claimed in claim 14, wherein the included angle is greater than the base angle.

16. The electronic device as claimed in claim 1, wherein the second optical element further includes a sticking material arranged on the second prism structure, and the sticking material has a surface away from the second prism structure, where a haze of the surface is greater than or equal to 3% and smaller than or equal to 50%.

17. The electronic device as claimed in claim 1, wherein the second optical element further includes a sticking material arranged on the second prism structure, and a refractive index of the sticking material is greater than or equal to 1.50 and smaller than or equal to 1.60.

18. The electronic device as claimed in claim 17, wherein the sticking material includes an insulating layer and an adhesive layer, and the adhesive layer is arranged between the insulating layer and the second prism structure.

19. The electronic device as claimed in claim 1, further comprising a reflective element arranged under the light guide plate.

* * * * *